(12) United States Patent
Si

(10) Patent No.: US 10,831,879 B2
(45) Date of Patent: Nov. 10, 2020

(54) NETWORK MONITORING DEVICE, METHOD, APPARATUS AND SYSTEM FOR RESETTING PASSWORD THEREOF, AND SERVER

(71) Applicant: HANGZHOU HIKVISION DIGITAL TECHNOLOGY CO., LTD., Hangzhou (CN)

(72) Inventor: Lujie Si, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 268 days.

(21) Appl. No.: 15/576,667

(22) PCT Filed: May 18, 2016

(86) PCT No.: PCT/CN2016/082472
§ 371 (c)(1),
(2) Date: Nov. 22, 2017

(87) PCT Pub. No.: WO2016/188353
PCT Pub. Date: Dec. 1, 2016

(65) Prior Publication Data
US 2018/0137269 A1 May 17, 2018

(30) Foreign Application Priority Data
May 22, 2015 (CN) .......................... 2015 1 0268009

(51) Int. Cl.
*G06F 21/45* (2013.01)
*H04L 29/06* (2006.01)
(Continued)

(52) U.S. Cl.
CPC .............. *G06F 21/45* (2013.01); *G06F 21/31* (2013.01); *H04L 9/14* (2013.01); *H04L 9/30* (2013.01);
(Continued)

(58) Field of Classification Search
CPC .......... G06F 21/45; G06F 21/46; G06F 21/31; H04L 9/14; H04L 9/30
See application file for complete search history.

(56) References Cited

U.S. PATENT DOCUMENTS 7,861,287 B2    12/2010  Pomerantz
8,078,881 B1    12/2011  Liu
(Continued)

FOREIGN PATENT DOCUMENTS

CN    1731408 A    2/2006
CN    1780413 A    5/2006
(Continued)

OTHER PUBLICATIONS

International Search Report of PCT Application No. PCT/CN2016/082472, dated Aug. 22, 2016.
(Continued)

*Primary Examiner* — Vance M Little
(74) *Attorney, Agent, or Firm* — Norton Rose Fulbright US LLP

(57) ABSTRACT

Disclosed are a network monitoring device, a method, apparatus and system for resetting a password of the network monitoring device, and a server. The method for resetting the password of the network monitoring device includes: a first characteristic code is generated according to encrypted content; the first characteristic code is sent to a server; a password resetting command from the server and a reset password from a client are received, wherein the password resetting command is obtained by encrypting the
(Continued)

first characteristic code with adoption of a first key, and returned by the server after receiving the first characteristic code; and the password resetting command is decrypted by adopting a second key, and the password of the network monitoring device is reset by utilizing the reset password, wherein the first key and the second key are a pair of keys in an asymmetric encryption algorithm.

10 Claims, 4 Drawing Sheets

(51) Int. Cl.
    *G06F 21/31*     (2013.01)
    *H04L 9/14*     (2006.01)
    *H04L 9/30*     (2006.01)

(52) U.S. Cl.
    CPC ............ *H04L 29/06* (2013.01); *H04L 63/083* (2013.01); *G06F 2221/2131* (2013.01)

(56) References Cited

U.S. PATENT DOCUMENTS

| | | | | |
|---|---|---|---|---|
| 2003/0158929 | A1* | 8/2003 | McNerney | H04L 43/00 709/223 |
| 2003/0182420 | A1* | 9/2003 | Jones | G06F 16/9535 709/224 |
| 2008/0046982 | A1* | 2/2008 | Parkinson | H04L 9/0891 726/5 |
| 2009/0092248 | A1* | 4/2009 | Rawson | G06F 21/31 380/45 |
| 2009/0150677 | A1* | 6/2009 | Vedula | G06F 21/46 713/183 |
| 2010/0235897 | A1 | 9/2010 | Mason et al. | |
| 2011/0078793 | A1* | 3/2011 | Orgill | H04L 63/1466 726/23 |
| 2011/0107400 | A1* | 5/2011 | Shankaranarayanan | G06F 21/31 726/4 |
| 2013/0212392 | A1* | 8/2013 | Nagarajan | H04L 9/0825 713/171 |
| 2015/0135302 | A1* | 5/2015 | Cohen | G06Q 10/10 726/12 |
| 2015/0312249 | A1* | 10/2015 | Lau | G06F 21/44 726/6 |

FOREIGN PATENT DOCUMENTS

| | | | | |
|---|---|---|---|---|
| CN | 103246841 | | 8/2013 | |
| CN | 103997679 | | 8/2014 | |
| EP | 2339776 | A1 * | 6/2011 | ......... G06F 21/6218 |
| EP | 2747333 | A1 * | 6/2014 | |
| GB | 2347248 | | 8/2000 | |
| WO | WO 2013/006296 | | 1/2013 | |

OTHER PUBLICATIONS

European Search Report from EP Patent Application No. 16799249.9, dated Dec. 20, 2018.

* cited by examiner

NETWORK MONITORING DEVICE, METHOD, APPARATUS AND SYSTEM FOR RESETTING PASSWORD THEREOF, AND SERVER

CROSS-REFERENCE TO RELATED APPLICATIONS

This application is a National Phase Application of PCT International Application No. PCT/CN2016/082472, International Filing Date May 18, 2016, claiming priority of China Patent Application No. 201510268009, filed May 22, 2015, which is hereby incorporated by reference in its entirety.

TECHNICAL FIELD

The present disclosure relates to the technical field of network security, and more particularly to a network monitoring device, a method, apparatus and system for resetting a password of the network monitoring device, and a server.

BACKGROUND

Each network monitoring device has one fixed serial number used for identifying the uniqueness of the device. One command for restoring a default password is computed by utilizing the serial number and one fixed algorithm.

When a user needs to restore a default password, a device serial number is sent to a password resetting server, and the password resetting server obtains a command by calculation via an algorithm. Then, the command is provided for the user and input into a device. The device also obtains a command by calculation via the device serial number. When the two commands are identical, authentication is passed, and at this time, the password is restored to a factory default value.

The above-mentioned method for resetting the password of the network monitoring device has the following disadvantages.

Disadvantage 1, The device serial number exists on a device label, and the device serial number may also be obtained by access to the device. A fixed encryption algorithm also exists in the device. As long as one device is cracked, the algorithm would be leaked. All devices adopting the algorithm suffer from security risks due to leakage of the serial number and the algorithm.

Disadvantage 2, If the device has a default password, the default password is a public password. The network security awareness of many users is not high. The default passwords would not be modified into own secure passwords. This is also a potential security hazard.

Any effective solution has not been proposed yet at present for the above-mentioned problems.

SUMMARY

An embodiment of the present disclosure provides a network monitoring device, a method, apparatus and system for resetting a password of the network monitoring device, and a server, intended to at least solve the technical problem in the related art that the security is relatively low in the process of restoring the default password and resetting the password.

According to an aspect of the embodiment of the present disclosure, a method for resetting a password of a network monitoring device is provided. The method includes: generating a first characteristic code according to encrypted content; sending the first characteristic code to a server; receiving a password resetting command from the server and a reset password from a client, wherein the password resetting command is obtained by encrypting the first characteristic code with adoption of a first key, and returned by the server after receiving the first characteristic code; and decrypting the password resetting command by adopting a second key, and resetting the password of the network monitoring device by utilizing the reset password, wherein the first key and the second key are a pair of keys in an asymmetric encryption algorithm.

According to an example embodiment, before sending the first characteristic code to the server, further including: setting a valid period of the first characteristic code, after receiving the password resetting command from the server and the reset password from the client, further including: judging whether the password resetting command is received within the valid period, wherein when a judging result is that the password resetting command is received within the valid period, the password resetting command is decrypted by adopting a second key, and the password of the network monitoring device is reset by utilizing the reset password.

According to an example embodiment, decrypting the password resetting command by adopting the second key and resetting the password of the network monitoring device by utilizing the reset password includes: decrypting the password resetting command by adopting the second key to obtain a second characteristic code; judging whether the second characteristic code is identical to the first characteristic code; and when a judging result is that the second characteristic code is identical to the first characteristic code, resetting the password of the network monitoring device by utilizing the reset password.

According to an example embodiment, after receiving the password resetting command from the server and the reset password from the client, further including: judging whether the reset password is valid, wherein when a judging result is that the reset password is valid, resetting the password of the network monitoring device by utilizing the reset password, and generating a first reset result, or when the judging result is that the reset password is invalid, generating a second reset result different from the first reset result.

According to another aspect of the embodiment of the present disclosure, a method for resetting a password of a network monitoring device is provided, including: receiving a first characteristic code from the network monitoring device, wherein the network monitoring device generates the first characteristic code according to encrypted content; encrypting the first characteristic code by utilizing a first key to obtain a password resetting command; and sending the password resetting command to the network monitoring device, wherein when a reset password from a client and the password resetting command are received by the network monitoring device, the password resetting command is decrypted by the network monitoring device with adoption of a second key, and the password of the network monitoring device is reset by the network monitoring device with utilization of the reset password, wherein the first key and the second key are a pair of keys in an asymmetric encryption algorithm.

According to another aspect of the embodiment of the present disclosure, an apparatus for resetting a password of a network monitoring device is provided, including: a generating element, configured to generate a first characteristic code according to encrypted content; a sending element, configured to send the first characteristic code to a server; a receiving element, configured to receive a password resetting command from the server and a reset password from a client, wherein the password resetting command is obtained by encrypting the first characteristic code with adoption of a first key, and returned by the server after receiving the first characteristic code; and a resetting element, configured to decrypt the password resetting command by adopting a second key, and reset the password of the network monitoring device by utilizing the reset password, wherein the first key and the second key are a pair of keys in an asymmetric encryption algorithm.

According to an example embodiment, further including: a setting element, configured to set, before the sending element sends the first characteristic code to the server, a valid period of the first characteristic code; and a first judging element, configured to judge, after the receiving element receives a password resetting command from the server and a reset password from a client, whether the password resetting command is received within the valid period, wherein the resetting element includes: a first resetting component, configured to decrypt, when the first judging element judges that the password resetting command is received within the valid period, the password resetting command by adopting a second key, and reset the password of the network monitoring device by utilizing the reset password.

According to an example embodiment, the resetting element includes: a decrypting component, configured to decrypt the password resetting command by adopting the second key to obtain a second characteristic code; a judging component, configured to judge whether the second characteristic code is identical to the first characteristic code; and a second resetting component, configured to reset, when the judging component judges that the second characteristic code is identical to the first characteristic code, the password of the network monitoring device by utilizing the reset password.

According to an example embodiment, further including: a second judging element, configured to judge, after the receiving element receives the password resetting command from the server and the reset password from the client, whether the reset password is valid, wherein when the second judging element judges that the reset password is valid, the resetting element resets the password of the network monitoring device by utilizing the reset password, and generates a first reset result, or when the second judging element judges that the reset password is invalid, the resetting element generates a second reset result different from the first reset result.

According to another aspect of the embodiment of the present disclosure, a network monitoring device is provided, including any one apparatus for resetting the password of the network monitoring device provided above in the present disclosure.

According to a further aspect of the embodiment of the present disclosure, a server is provided, including: a receiver, configured to receive a first characteristic code from a network monitoring device, wherein the network monitoring device generates the first characteristic code according to encrypted content; encrypter, configured to encrypt the first characteristic code by utilizing a first key to obtain a password resetting command, wherein the first key and a second key are a pair of keys in an asymmetric encryption algorithm; and a sender, configured to send the password resetting command to the network monitoring device, wherein when receiving a reset password from a client and the password resetting command, the network monitoring device decrypts the password resetting command by adopting the second key, and resets a password of the network monitoring device by utilizing the reset password, wherein the first key and the second key are a pair of keys in the asymmetric encryption algorithm.

According to a yet further aspect of the embodiment of the present disclosure, a system for resetting a password of a network monitoring device is provided, including: a client, configured to send a reset password to a network monitoring device; a server, configured to receive a first characteristic code, encrypt the first characteristic code by utilizing a first key to obtain a password resetting command, and send the password resetting command to the network monitoring device; and the network monitoring device, configured to generate the first characteristic code according to encrypted content, decrypt, when receiving the password resetting command and the reset password, the password resetting command by adopting a second key, and reset a password of the network monitoring device by utilizing the reset password, wherein the first key and the second key are a pair of keys in an asymmetric encryption algorithm.

In the embodiment of the present disclosure, a first characteristic code is generated according to encrypted content; the first characteristic code is sent to a server; a password resetting command from the server and a reset password from a client are received, wherein the password resetting command is obtained by encrypting the first characteristic code with adoption of a first key, and returned by the server after receiving the first characteristic code; and the password resetting command is decrypted by adopting a second key, and a password of a network monitoring device is reset by utilizing the reset password, wherein the first key and the second key are a pair of keys in an asymmetric encryption algorithm. Data is encrypted in a password resetting process by using the asymmetric encryption algorithm. The second key in the asymmetric encryption algorithm is stored in the network monitoring device, and the first key in the asymmetric encryption algorithm is stored in a password server. The second key stored in the networking monitoring device is a public key, and the public key itself is a key open to the public, so that the security of the whole set of password resetting mechanism does not depend on the network monitoring device. The security of the resetting password mechanism can be ensured by means of the security of the password server and a private key in the password server, and the problem in the related art that security is relatively low in the process of restoring a default password and resetting a password is solved, thereby achieving the effect of enhancing the security of the network monitoring device.

BRIEF DESCRIPTION OF THE DRAWINGS

The drawings illustrated herein are intended to provide a further understanding for the present disclosure, and form a part of the present application. The schematic embodiments and illustrations of the present disclosure are intended to explain the present disclosure, and do not form improper limits to the present disclosure. In the drawings.

DETAILED DESCRIPTION OF THE EMBODIMENTS

Figure 1:
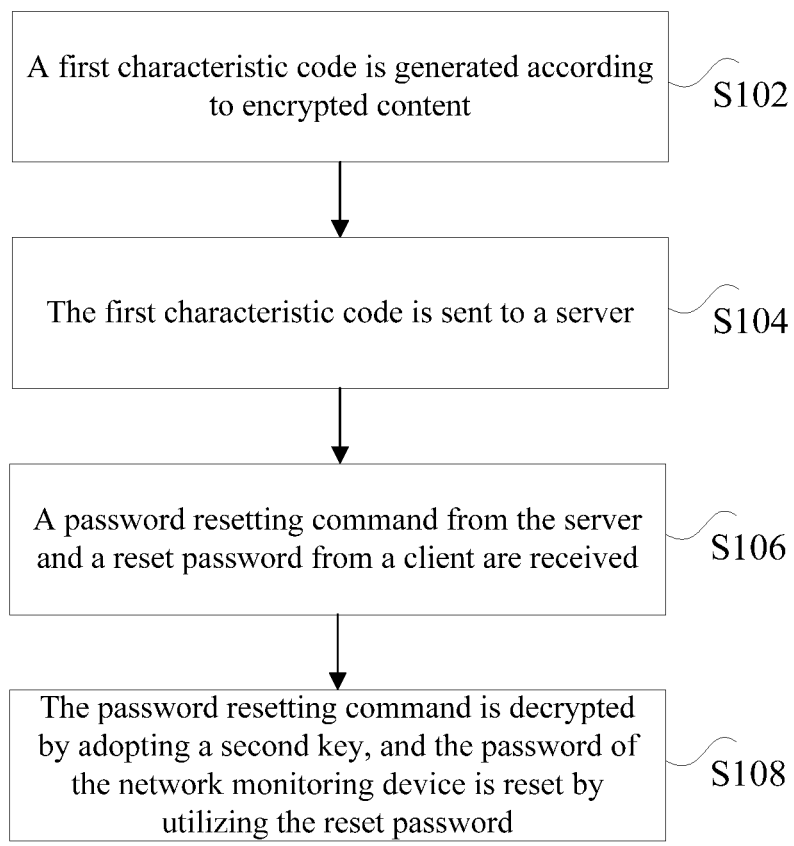
FIG. 1 is a flowchart of a method for resetting a password of a network monitoring device according to an embodiment of the present disclosure.

In order to make a person skilled in the art better understand the solutions of the present disclosure, the technical solutions in the embodiments of the present disclosure will be clearly and completely described hereinbelow with reference to the drawings in the embodiments of the present disclosure. Obviously, the described embodiments are only a part of the embodiments of the present disclosure, not all of the embodiments. On the basis of the embodiments of the present disclosure, all other embodiments obtained on the premise of no creative work of a person of ordinary skill in the art fall within the scope of protection of the present disclosure.

It is important to note that the description and claims of the present disclosure and terms "first", "second" and the like in the drawings are intended to distinguish similar objects, and do not need to describe a specific sequence or a precedence order. It should be understood that data used in such a way can be exchanged under appropriate conditions, in order that the embodiments of the present disclosure described here can be implemented in a sequence except sequences graphically shown or described here. In addition, terms "include" and "have" and any inflexions thereof are intended to cover non-exclusive inclusions. For example, processes, methods, systems, products or devices containing a series of steps or units do not need to clearly list those steps or units, and may include other inherent steps or units of these processes, methods, products or devices, which are not clearly listed.

Firstly, technical terms involved in the embodiment of the present disclosure are explained as follows.

Network monitoring device: a security monitoring device which is provided with a network component and is able to be accessed via an Internet Protocol (IP) address, including a Digital Video Recorder (DVR), a Digital Video Server (DVS), a Network Video Recorder (NVR), a Central Video Recorder (CVR), an IP Camera (IPC), and a transmission and display device.

Characteristic code: a character string generated by a device according to parameters such as a device serial number, a time value, a key version and a random number.

Command: obtained by encrypting the characteristic code by using an asymmetric encryption algorithm private key, wherein the corresponding asymmetric encryption algorithm private key is found according to a key version in the characteristic code.

Asymmetric encryption algorithm: having a pair of keys including a public key and a private key, wherein the public key is open to the public, and the private key is kept by a generator (not open to the public). During encryption, data is encrypted by using the public key, and the encrypted data may be decrypted only by using the private key.

According to an embodiment of the present disclosure, a method for resetting a password of a network monitoring device is provided. It is important to note that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

FIG. 1 is a flowchart of a method for resetting a password of a network monitoring device according to an embodiment of the present disclosure. As shown in FIG. 1, the method mainly includes step S102 to step S108 as follows.

In step S102, a first characteristic code is generated according to encrypted content.

In an example embodiment, during delivery of a network monitoring device, an asymmetric algorithm public key would be reserved in the device. Meanwhile, a corresponding asymmetric algorithm private key is stored in a password server. Herein, encrypted content may include an identification number and a random value of the network monitoring device, and the identification number may be a device serial number of the network monitoring device.

In step S104, the first characteristic code is sent to a server.

In an example embodiment, when a user needs to reset a password of the network monitoring device, a first characteristic code may be obtained from the network monitoring device by utilizing a client, and then the client sends the first characteristic code to a password server. That is, the network monitoring device sends the first characteristic code to the server via the client. The network monitoring device may directly send the first characteristic code to the server. Herein, under a condition of communication via the client, data exchange may be performed between the client and the network monitoring device by adopting local area network communication, and the client may obtain the first characteristic code from the network monitoring device by utilizing a multicast communication mode. Data exchange may be performed between the client and the server by means of network communication, or may be performed by means of other offline ways, so that the password of the network monitoring device can be normally reset regardless of whether the network monitoring device is accessed to the internet.

In step S106, a password resetting command from the server and a reset password from the client are received, wherein the password resetting command is obtained by encrypting the first characteristic code with adoption of a first key, and returned by the server after receiving the first characteristic code.

In an example embodiment, in the embodiment of the present disclosure, the first key may be a private key in an asymmetric encryption algorithm, after receiving the first characteristic code, forwarded by the client, from the network monitoring device or after receiving the first characteristic code directly sent by the network monitoring device, the server encrypts the first characteristic code by utilizing the asymmetric algorithm private key, generates a password resetting command, and sends the password resetting command to the network monitoring device. Or, the server sends the password resetting command to the client, and then the client transmits the password resetting command together with a reset password (i.e., new password) to the network monitoring device. Since a first characteristic code is randomly generated, first characteristic codes generated by different network monitoring devices are different, so that a password resetting command obtained by utilizing a first characteristic code may be valid only on a network monitoring device generating the first characteristic code.

In step S108, the password resetting command is decrypted by adopting a second key, and the password of the network monitoring device is reset by utilizing the reset password, wherein the first key and the second key are a pair of keys in the asymmetric encryption algorithm.

In an example embodiment, in the embodiment of the present disclosure, the second key may be a public key in the asymmetric encryption algorithm, after receiving the password resetting command and the reset password, the network monitoring device decrypts the password resetting command by utilizing the asymmetric algorithm public key, and after decryption is successful, the network monitoring device resets the password itself by utilizing the reset password.

According to the method for resetting the password of the network monitoring device provided in the embodiment of the present disclosure, data is encrypted in a password resetting process by using an asymmetric encryption algorithm. An asymmetric algorithm public key is stored in a network monitoring device, and an asymmetric algorithm private key is stored in a password server. A key itself in the network monitoring device is a key open to the public, so that the security of a whole set of password resetting mechanism does not depend on the network monitoring device. The security of the resetting password mechanism can be ensured by means of the security of the password server and the private key in the password server, and the problem in the related art that security is relatively low in the process of restoring a default password and resetting a password is solved, thereby achieving the effect of enhancing the security of the network monitoring device.

Figure 2:
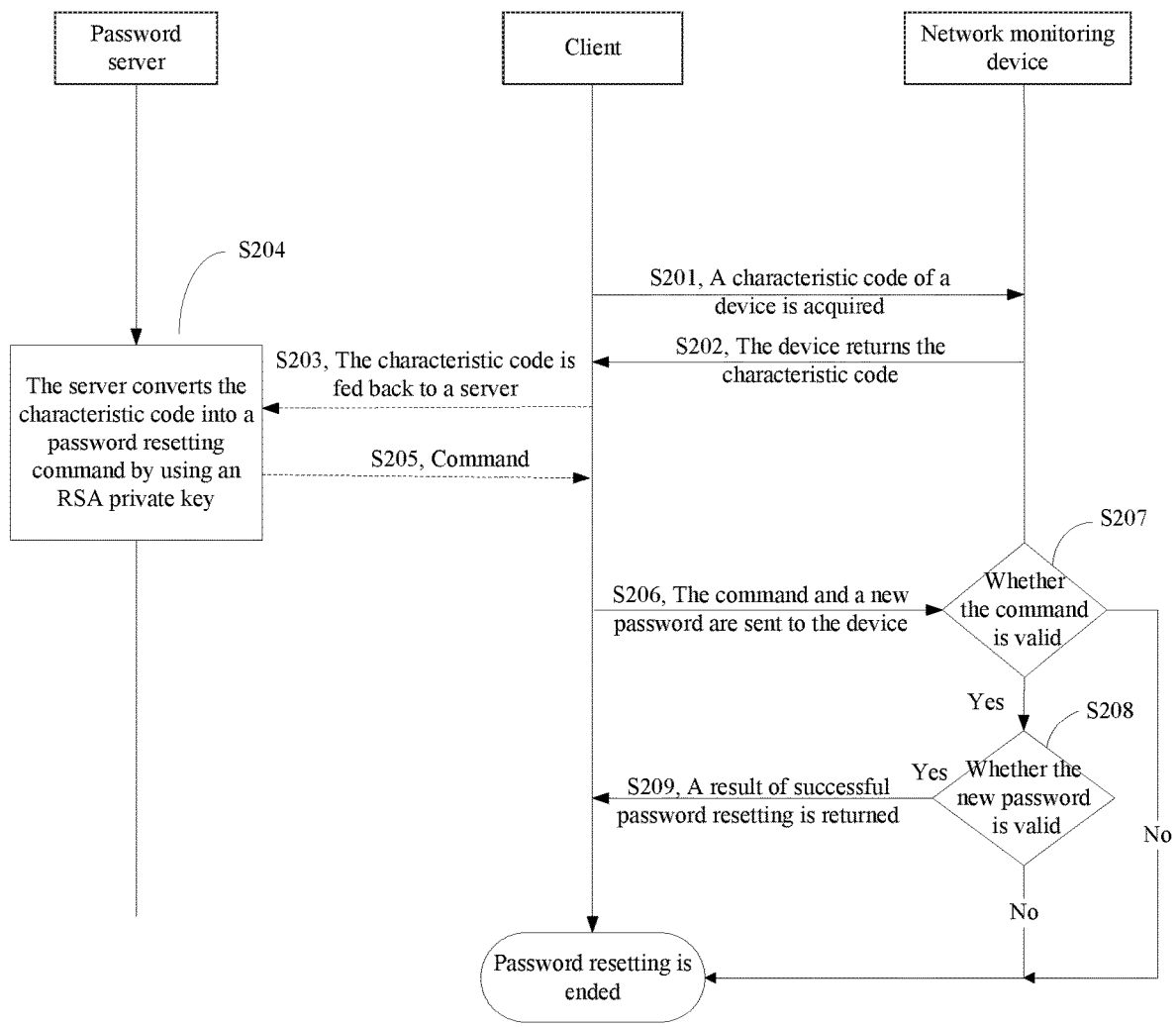
FIG. 2 is a timing diagram of an alternative method for resetting a password of a network monitoring device according to a preferred embodiment of the present disclosure.

FIG. 2 is a timing diagram of an alternative method for resetting a password of a network monitoring device according to a preferred embodiment of the present disclosure. As shown in FIG. 2, the method mainly includes step S201 to step S209 as follows.

In S201, a characteristic code of a network monitoring device is obtained.

In an example embodiment, similar to step S102, when a user needs to reset a password of the network monitoring device, a trigger instruction may be issued to the network monitoring device by utilizing a client, so as to trigger the network monitoring device to generate a first characteristic code according to encrypted content.

In S202, the network monitoring device returns the characteristic code.

In S203, the characteristic code is fed back to a server.

In an example embodiment, step S202 and step S203 are equivalent to step S104. That is, the network monitoring device feeds the first characteristic code back to the client, and then the client feeds the first characteristic code back to a password server. Differently, before feeding the first characteristic code back to the client, the network monitoring device will set a valid period for the first characteristic code. Similarly, the network monitoring device may also directly send the first characteristic code to the server.

In S204, the server converts the characteristic code into a password resetting command by utilizing an asymmetric algorithm private key.

In S205, the server transmits the password resetting command to the client.

In S206, the client transmits the password resetting command and a reset password to the network monitoring device.

In an example embodiment, step S204, step S205 and step S206 are equivalent to step S106. That is, under the condition of communication via the client, after the client forwards the first characteristic code from the network monitoring device to the server, the server encrypts the first characteristic code by utilizing the asymmetric algorithm private key, generates a password resetting command, and sends the password resetting command to the client; and then the client transmits the password resetting command together with a reset password (i.e., new password) to the network monitoring device.

In S207, the network monitoring device judges whether the password resetting command is valid.

That is, after receiving the password resetting command from the server and the reset password from the client, the network monitoring device judges whether the password resetting command is received within the valid period. Herein, when a judging result is that the password resetting command is received within the valid period, the password of the network monitoring device is reset by utilizing the reset password. Correspondingly, when the judging result is that the password resetting command is not received within the valid period, it is determined that the password is unsuccessfully reset.

The network monitoring device controls the valid period of the first characteristic code, such that the corresponding password resetting command is valid within a specified period. Resetting of the password of the network monitoring device again caused by improper protection of the password resetting command is avoided. The effect of enhancing the stability of password resetting is achieved.

In S208, when the password resetting command is valid, the network monitoring device judges whether the reset password is valid.

In S209, when a judging result is that the reset password is valid, the password of the network monitoring device is reset by utilizing the reset password, and a result of successful password resetting is returned to the client.

That is, after receiving the password resetting command from the server and the reset password from the client, the network monitoring device judges whether the reset password is valid. In an example embodiment, the network monitoring device mainly judges whether the level of the reset password reaches a level requirement, and when a judging result is that the reset password is valid, namely when it is determined that the level of the reset password reaches the level requirement, the password of the network monitoring device is reset by utilizing the reset password.

By judging the validness of the reset password, a user is guided to set a password with a relatively high security level, the security problem caused by the fact that a reset password is a weak password set by the user is avoided, and the effect of further enhancing the security of a network monitoring device is achieved.

Herein, when the judging result is that the reset password is valid, the password of the network monitoring device is reset by utilizing the reset password, and meanwhile, a first reset result may be generated. The first reset result represents that the password is successfully reset. Or, when the judging result is that the reset password is invalid, a second reset result different from the first reset result is generated. The second reset result represents that the password is unsuccessfully reset.

In an example embodiment, in the process of resetting the password of the network monitoring device, the network monitoring device would decrypt the password resetting command by adopting the second key to obtain a second characteristic code, and judge whether the second characteristic code is identical to the first characteristic code, wherein when a judging result is that the second characteristic code is identical to the first characteristic code, the password of the network monitoring device is reset by utilizing the reset password.

Since a first characteristic code is randomly generated, first characteristic codes generated by different network monitoring devices are different, so that the password resetting command obtained by utilizing the first characteristic code may be valid only on a network monitoring device generating the first characteristic code. It is judged whether a characteristic code transmitted by a server is identical to a locally-stored characteristic code, and when a judging result is that the second characteristic code is identical to the first characteristic code, the password of the network monitoring device is reset by utilizing the reset password, so that targeted password resetting can be realized.

Figure 3:
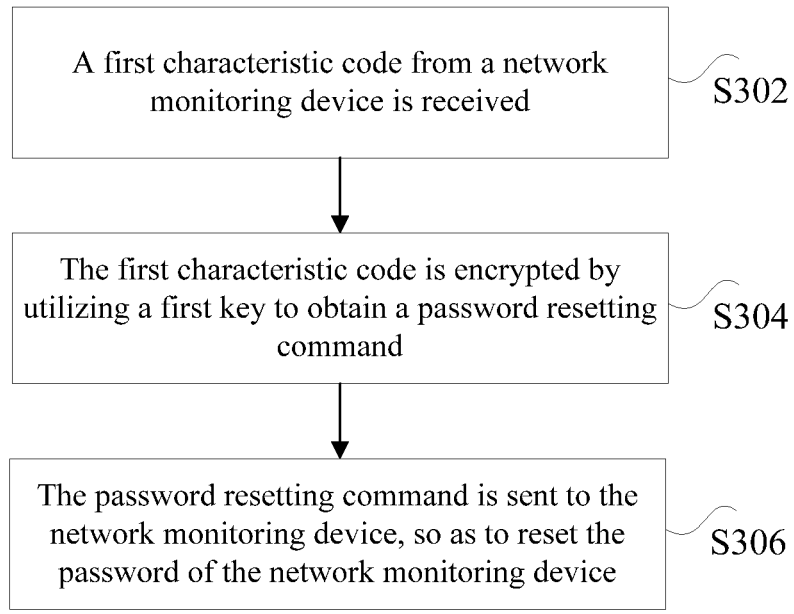
FIG. 3 is a flowchart of a method for resetting a password of a network monitoring device according to another embodiment of the present disclosure.

FIG. 3 is a flowchart of a method for resetting a password of a network monitoring device according to another embodiment of the present disclosure. As shown in FIG. 3, the method mainly includes step S302 to step S306 as follows.

In S302, a first characteristic code from a network monitoring device is received, wherein the network monitoring device generates the first characteristic code according to encrypted content.

In an example embodiment, during delivery of the network monitoring device, an asymmetric algorithm public key would be reserved in the device. Meanwhile, a corresponding asymmetric algorithm private key is stored in a password server. When a user needs to reset the password of the network monitoring device, the network monitoring device generates a first characteristic code according to encrypted content, and then a client sends the first characteristic code to a server. The network monitoring device may directly send the first characteristic code to the server. Herein, the encrypted content includes an identification number and a random value of the network monitoring device, and the identification number may be a device serial number of the network monitoring device.

In S304, the first characteristic code is encrypted by utilizing a first key to obtain a password resetting command.

In an example embodiment, after receiving the first characteristic code, the server encrypts the first characteristic code by utilizing a first key to obtain a password resetting command, and returns the password resetting command That is, after the client forwards the first characteristic code from the network monitoring device to the server, the server encrypts the first characteristic code by utilizing the asymmetric algorithm private key, and generates a password resetting command.

In S306, the password resetting command is sent to the network monitoring device, wherein when receiving a reset password from the client and the password resetting command, the network monitoring device decrypts the password resetting command by adopting a second key, and resets the password of the network monitoring device by utilizing the reset password, wherein the first key and the second key are a pair of keys in an asymmetric encryption algorithm.

In an example embodiment, the server may send the password resetting command to the client, and then the client transmits the password resetting command together with a reset password (i.e., new password) to the network monitoring device. Since a first characteristic code is randomly generated, first characteristic codes generated by different network monitoring devices are different, so that a password resetting command obtained by utilizing the first characteristic code may be valid only on a network monitoring device generating the first characteristic code, and targeted password resetting can be realized. After receiving the password resetting command and the reset password, the network monitoring device resets the password of the network monitoring device according to the password resetting command and the reset password.

According to the method for resetting the password of the network monitoring device provided in the embodiment of the present disclosure, data is encrypted in a password resetting process by using an asymmetric encryption algorithm. An asymmetric algorithm public key is stored in a network monitoring device, and an asymmetric algorithm private key is stored in a password server. A key itself in the network monitoring device is a key open to the public, so that the security of a whole set of password resetting mechanism does not depend on the network monitoring device. The security of the resetting password mechanism can be ensured by means of the security of the password server and the private key in the password server, and the problem in the related art that security is relatively low in the process of restoring a default password and resetting a password is solved, thereby achieving the effect of enhancing the security of the network monitoring device.

Figure 4:
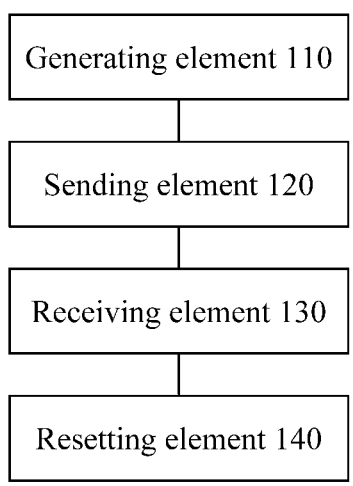
FIG. 4 is a schematic diagram of an apparatus for resetting a password of a network monitoring device according to an embodiment of the present disclosure.

FIG. 4 is a schematic diagram of an apparatus for resetting a password of a network monitoring device according to an embodiment of the present disclosure. As shown in FIG. 4, the apparatus mainly includes a generating element 110, a sending element 120, a receiving element 130 and a resetting element 140, wherein the generating element 110 is configured to generate a first characteristic code according to encrypted content.

In an example embodiment, during delivery of the network monitoring device, an asymmetric algorithm public key would be reserved in the device. Meanwhile, a corresponding asymmetric algorithm private key is stored in a password server. Herein, encrypted content may include an identification number and a random value of the network monitoring device, and the identification number may be a device serial number of the network monitoring device.

The sending element 120 is configured to send the first characteristic code to a server.

In an example embodiment, when a user needs to reset the password of the network monitoring device, a first characteristic code may be obtained from the network monitoring device by utilizing a client, and then the client sends the first characteristic code to a password server. That is, the sending element 120 of the apparatus for resetting the password of the network monitoring device sends the first characteristic code to the server via the client. The network monitoring device may directly send the first characteristic code to the server. Herein, under the condition of communication via the client, data exchange may be performed between the client and the sending element 120 by adopting local area network communication, and the client may obtain the first characteristic code from the network monitoring device by utilizing a multicast communication mode. Data exchange may be performed between the client and the server by means of network communication, or may be performed by means of other offline ways, so that the password of the network monitoring device can be normally reset regardless of whether the network monitoring device is accessed to the internet.

The receiving element 130 is configured to receive a password resetting command from the server and a reset password from a client, wherein the password resetting command is obtained by encrypting the first characteristic code with adoption of a first key, and returned by the server after receiving the first characteristic code.

In an example embodiment, in the embodiment of the present disclosure, the first key may be a private key in an asymmetric encryption algorithm, after receiving the first characteristic code, forwarded by the client, from the network monitoring device or after receiving the first characteristic code directly sent by the network monitoring device, the server encrypts the first characteristic code by utilizing the asymmetric algorithm private key, generates a password resetting command, and sends the password resetting command to the network monitoring device. Or, the server sends the password resetting command to the client, and then the client transmits the password resetting command together with a reset password (i.e., new password) to the network monitoring device. Since the first characteristic code is randomly generated, first characteristic codes generated by different network monitoring devices are different, so that the password resetting command obtained by utilizing the first characteristic code may be valid only on a network monitoring device generating the first characteristic code.

The resetting element 140 is configured to decrypt the password resetting command by adopting a second key, and reset the password of the network monitoring device by utilizing the reset password, wherein the first key and the second key are a pair of keys in an asymmetric encryption algorithm.

In an example embodiment, in the embodiment of the present disclosure, the second key may be a public key in the asymmetric encryption algorithm, after receiving the password resetting command and the reset password, the network monitoring device decrypts the password resetting command by utilizing the asymmetric algorithm public key, and after decryption is successful, the network monitoring device resets the password thereof by utilizing the reset password.

According to the apparatus for resetting the password of to network monitoring device provided in the embodiment of the present disclosure, data is encrypted in a password resetting process by using an asymmetric encryption algorithm. An asymmetric algorithm public key is stored in the network monitoring device, and an asymmetric algorithm private key is stored in a password server. A key itself in the network monitoring device is a key open to the public, so that the security of a whole set of password resetting mechanism does not depend on the network monitoring device. The security of the resetting password mechanism can be ensured by means of the security of the password server and the private key in the password server, and the problem in the related art that security is relatively low in the process of restoring a default password and resetting a password is solved, thereby achieving the effect of enhancing the security of the network monitoring device.

In an example embodiment, the apparatus for resetting the password of the network monitoring device provided in the embodiment of the present disclosure further includes a setting element and a first judging element. The resetting element 140 includes a first resetting component, wherein the setting element is configured to set, before the sending element 120 sends the first characteristic code to a server, a valid period of the first characteristic code; and the first judging element is configured to judge, after the receiving element 130 receives a password resetting command from the server and a reset password from a client, whether the password resetting command is received within the valid period. The first resetting component is configured to decrypt, when the first judging element determines that the password resetting command is received within the valid period, the password resetting command by adopting a second key, and reset the password of the network monitoring device by utilizing the reset password.

By controlling the valid period of the first characteristic code, the corresponding password resetting command is valid within a specified period. Resetting of the password of the network monitoring device again caused by improper protection of the password resetting command is avoided. The effect of enhancing the stability of password resetting is achieved.

In an example embodiment, the resetting element 140 further includes a decrypting component, a judging component and a second resetting component, wherein the decrypting component is configured to decrypt the password resetting command by adopting the second key to obtain a second characteristic code; the judging component is configured to judge whether the second characteristic code is identical to the first characteristic code; and the second resetting component is configured to reset, when the judging component determines that the second characteristic code is identical to the first characteristic code, the password of the network monitoring device by utilizing the reset password.

Since the first characteristic code is randomly generated, first characteristic codes generated by different network monitoring devices are different, so that the password resetting command obtained by utilizing the first characteristic code may be valid only on the network monitoring device generating the first characteristic code. It is judged whether the characteristic code transmitted by the server is identical to the locally-stored characteristic code, and when the judging result is that the second characteristic code is identical to the first characteristic code, the password of the network monitoring device is reset by utilizing the reset password, so that targeted password resetting can be realized.

In an example embodiment, the apparatus for resetting the password of the network monitoring device provided in the embodiment of the present disclosure further includes a second judging element. The second judging element is configured to judge, after the receiving element 130 receives the password resetting command from the server and the reset password from the client, whether the reset password is valid, and specifically, judge whether the level of the reset password reaches a level requirement, wherein when the second judging element determines that the reset password is valid, namely when the second judging element determines that the level of the reset password reaches the level requirement, the resetting element 140 resets the password of the network monitoring device by utilizing the reset password, and generates a first reset result. The first reset result represents that the password is successfully reset. Or, when the second judging element determines that the reset password is invalid, the resetting element 140 generates a second reset result different from the first reset result. The second reset result represents that the password is unsuccessfully reset.

By judging the validness of the reset password, a user is guided to set a password with a relatively high security level, the security problem of the user caused by the fact that a reset password is weak is avoided, and the effect of further enhancing the security of a network monitoring device is achieved.

The embodiment of the present disclosure also provides a network monitoring device. The network monitoring device includes any one apparatus for resetting the password of the network monitoring device provided above in the present disclosure.

Figure 5:
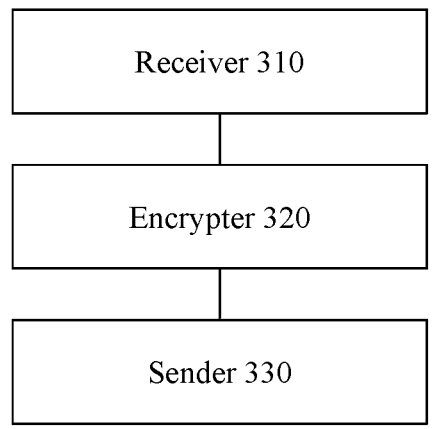
FIG. 5 is a schematic diagram of a server according to an embodiment of the present disclosure.

The embodiment of the present disclosure also provides a server. FIG. 5 is a schematic diagram of a server according to an embodiment of the present disclosure. As shown in FIG. 5, the server mainly includes a receiver 310, encrypter 320 and a sender 330, wherein the receiver 310 is configured to receive a first characteristic code from a network monitoring device, wherein the network monitoring device generates the first characteristic code according to encrypted content.

In an example embodiment, during delivery of the network monitoring device, an asymmetric algorithm public key would be reserved in the device. Meanwhile, a corresponding asymmetric algorithm private key is stored in a password server. When a user needs to reset the password of the network monitoring device, the network monitoring device generates the first characteristic code according to a first key, and then a client sends the first characteristic code to the receiver 310 of the server. Herein, encrypted content includes an identification number and a random value of the network monitoring device, and the identification number may be a device serial number of the network monitoring device.

The encrypter 320 is configured to encrypt the first characteristic code by utilizing the first key to obtain a password resetting command In an example embodiment, after the receiver 310 receives the first characteristic code, the encrypter 320 encrypts the first characteristic code by utilizing the first key to obtain the password resetting command, and returns the password resetting command That is, after the client forwards the first characteristic code from the network monitoring device to the server, the server encrypts the first characteristic code by utilizing the asymmetric algorithm private key, and generates a password resetting command.

The sender 330 is configured to send the password resetting command to the network monitoring device, wherein when receiving a reset password from a client and the password resetting command, the network monitoring device decrypts the password resetting command by adopting the second key, and resets the password of the network monitoring device by utilizing the reset password, wherein the first key and the second key are a pair of keys in the asymmetric encryption algorithm.

In an example embodiment, the sender 330 may send the password resetting command to the client, and then the client transmits the password resetting command together with a reset password (i.e., new password) to the network monitoring device. Since the first characteristic code is randomly generated, first characteristic codes generated by different network monitoring devices are different, so that the password resetting command obtained by utilizing the first characteristic code may be valid only on the network monitoring device generating the first characteristic code, and targeted password resetting can be realized. After receiving the password resetting command and the reset password, the network monitoring device resets the password of the network monitoring device according to the password resetting command and the reset password.

According to the server provided in the embodiment of the present disclosure, data is encrypted in a password resetting process by using an asymmetric encryption algorithm. An asymmetric algorithm public key is stored in the network monitoring device, and an asymmetric algorithm private key is stored in a password server. A key itself in the network monitoring device is a key open to the public, so that the security of a whole set of password resetting mechanism does not depend on the network monitoring device. The security of the resetting password mechanism can be ensured by means of the security of the password server and the private key in the password server, and the problem in the related art that security is relatively low in the process of restoring a default password and resetting a password is solved, thereby achieving the effect of enhancing the security of the network monitoring device.

Figure 6:
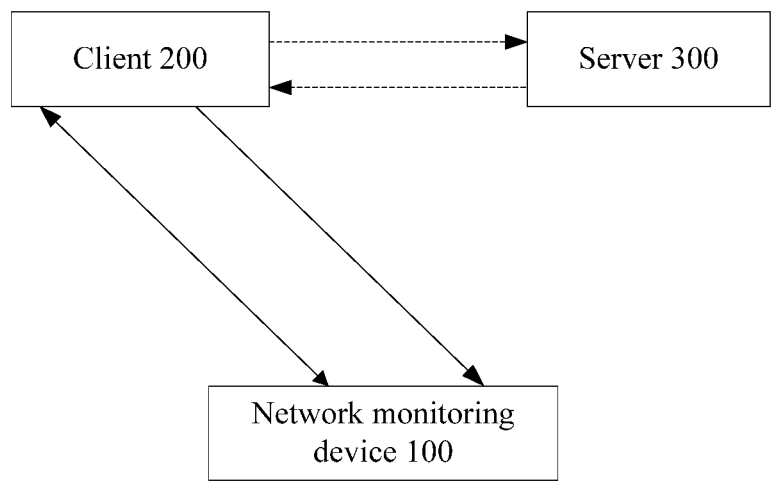
FIG. 6 is a schematic diagram of a system for resetting a password of a network monitoring device according to an embodiment of the present disclosure.

The embodiment of the present disclosure also provides a system for resetting a password of a network monitoring device. FIG. 6 is a schematic diagram of a system for resetting a password of a network monitoring device according to an embodiment of the present disclosure. As shown in FIG. 6, the system mainly includes a network monitoring device 100, a client 200 and a server 300, wherein the network monitoring device 100 is configured to generate a first characteristic code according to encrypted content.

In an example embodiment, during delivery of the network monitoring device 100, an asymmetric algorithm public key would be reserved in the device. Meanwhile, a corresponding asymmetric algorithm private key is stored in a password server. Herein, encrypted content may include an identification number and a random value of the network monitoring device 100, and the identification number may be a device serial number of the network monitoring device 100. When a user needs to reset a password of the network monitoring device 100, a first characteristic code may be obtained from the network monitoring device 100 by utilizing the client 200, and then the client 200 sends the first characteristic code to the password server 300. That is, the network monitoring device 100 sends the first characteristic code to the server 300 via the client 200.

The server 300 is configured to receive the first characteristic code, encrypt the first characteristic code by utilizing a first key to obtain a password resetting command, and send the password resetting command to the network monitoring device 100.

In an example embodiment, in the embodiment of the present disclosure, the first key may be a private key in an asymmetric encryption algorithm, after receiving the first characteristic code, the server 300 encrypts the first characteristic code by utilizing the asymmetric algorithm private key, generates a password resetting command, and sends the password resetting command to the network monitoring device 100. Or, the server sends the password resetting command to the client 200, and then the client 200 transmits the password resetting command together with a reset password (i.e., new password) to the network monitoring device 100. Since the first characteristic code is randomly generated, first characteristic codes generated by different network monitoring devices 100 are different, so that the password resetting command obtained by utilizing the first characteristic code may be valid only on the network monitoring device 100 generating the first characteristic code, and targeted password resetting can be realized.

Herein, data exchange may be performed between the client 200 and the network monitoring device 100 by adopting local area network communication, and the client 200 may obtain the first characteristic code from the network monitoring device 100 by utilizing a multicast communication mode. Data exchange may be performed between the client 200 and the server 300 by means of network communication, or may be performed by means of other offline ways, so that the password of the network monitoring device can be normally reset regardless of whether the network monitoring device 100 is accessed to the internet.

According to the system for resetting the password of the network monitoring device provided in the embodiment of the present disclosure, data is encrypted in a password resetting process by using an asymmetric encryption algorithm. An asymmetric algorithm public key is stored in the network monitoring device, and an asymmetric algorithm private key is stored in a password server. A key itself in the network monitoring device is a key open to the public, so that the security of a whole set of password resetting mechanism does not depend on the network monitoring device. The security of the resetting password mechanism can be ensured by means of the security of the password server and the private key in the password server, and the problem in the related art that security is relatively low in the process of restoring a default password and resetting a password is solved, thereby achieving the effect of enhancing the security of the network monitoring device.

In the above-mentioned embodiments of the present disclosure, descriptions for each embodiment are emphasized respectively, and parts which are not elaborated in a certain embodiment may refer to relevant descriptions of other embodiments.

In some embodiments provided by the present application, it will be appreciated that the disclosed technical contents may be implemented in other modes. Herein, the apparatus embodiment described above is only schematic. For example, division of the units may be division of logical functions, and there may be additional division modes during actual implementation. For example, a plurality of units or components may be combined or integrated to another system, or some features may be omitted or may be not executed. In addition, displayed or discussed mutual coupling or direct coupling or communication connection may be performed via some interfaces, and indirect coupling or communication connection between units or modules may be in an electrical form or other forms.

The units illustrated as separate parts may be or may not be physically separated. Parts for unit display may be or may not be physical units. That is, the parts may be located at a place or may be distributed on a plurality of units. The aims of the solutions of the embodiments may be achieved by selecting some or all units according to actual requirements.

In addition, all function units in all embodiments of the present disclosure may be integrated in a processing unit, or each unit may exist separately and physically, or two or more units may be integrated in a unit. The integrated unit may be implemented in a hardware form or may be implemented in a form of software function unit.

When being implemented in a form of software function unit and is sold or used as an independent product, the integrated unit may be stored in a computer-readable storage medium. Based on this understanding, the technical solutions of the present disclosure may be substantially embodied in a form of software product or parts contributing to the related art or all or some of the technical solutions may be embodied in a form of software product, and the computer software product is stored in a storage medium which includes a plurality of instructions enabling a computer device (which may be a personal computer, a server, a network device or the like) to execute all or some of the steps of the method according to each embodiment of the present disclosure. The above-mentioned storage medium includes: various media capable of storing program codes, such as a U disk, a Read-Only Memory (ROM), a Random Access Memory (RAM), a mobile hard disk, a magnetic disk or an optical disk.

The above is only preferred implementation manners of the present disclosure. It should be pointed out that a person of ordinary skill in the art can also make some improvements and modifications without departing from the principle of the present disclosure. These improvements and modifications should fall within the scope of protection of the present disclosure.

What is claimed is:

1. A method for resetting a password of a network monitoring device, comprising:
    generating a first characteristic code according to encrypted content;
    sending the first characteristic code to a server;
    receiving a password resetting command from the server and a reset password from a client, wherein the password resetting command is obtained by encrypting the first characteristic code with adoption of a first key, and returned by the server after receiving the first characteristic code; and
    decrypting the password resetting command by adopting a second key, and resetting the password of the network monitoring device by utilizing the reset password, wherein the first key and the second key are a pair of keys in an asymmetric encryption algorithm;
    wherein the password resetting command together with the reset password are transmitted from the client to the network monitoring device; and
    wherein the client is remote from the network monitoring device.

2. The method as claimed in claim 1, wherein
    before sending the first characteristic code to the server, further comprising: setting a valid period of the first characteristic code; and
    after receiving the password resetting command from the server and the reset password from the client, further comprising: judging whether the password resetting command is received within the valid period,
    wherein when a judging result is that the password resetting command is received within the valid period, the password resetting command is decrypted by adopting the second key, and the password of the network monitoring device is reset by utilizing the reset password.

3. The method as claimed in claim 1, wherein decrypting the password resetting command by adopting the second key and resetting the password of the network monitoring device by utilizing the reset password comprises:
    decrypting the password resetting command by adopting the second key to obtain a second characteristic code;
    judging whether the second characteristic code is identical to the first characteristic code; and
    when a judging result is that the second characteristic code is identical to the first characteristic code, resetting the password of the network monitoring device by utilizing the reset password.

4. The method as claimed in claim 1, wherein after receiving the password resetting command from the server and the reset password from the client, further comprising:
    judging whether the reset password is valid,
    wherein when a judging result is that the reset password is valid, resetting the password of the network monitoring device by utilizing the reset password, and generating a first reset result, or when the judging result is that the reset password is invalid, generating a second reset result different from the first reset result.

5. A method for resetting a password of a network monitoring device, comprising:
receiving a first characteristic code from the network monitoring device, wherein the network monitoring device generates the first characteristic code according to encrypted content;
encrypting the first characteristic code by utilizing a first key to obtain a password resetting command; and
sending the password resetting command to the network monitoring device, wherein when a reset password from a client and the password resetting command are received by the network monitoring device, the password resetting command is decrypted by the network monitoring device with adoption of a second key, and the password of the network monitoring device is reset by the network monitoring device with utilization of the reset password, wherein the first key and the second key are a pair of keys in an asymmetric encryption algorithm;
wherein the password resetting command together with the reset password are from the client to the network monitoring device; and
wherein the client is remote from the network monitoring device.

6. A network monitoring device, comprising an apparatus for reselling the password of the network monitoring device, comprising a non-transitory storage medium and a processor, wherein the storage medium is configured to store a program, and the processor is configured to execute the program and, when executing the program, perform the following steps;
generating a first characteristic code according to encrypted content;
sending the first characteristic code to a server;
receiving a password resetting command from the server and a reset password from a client, wherein the password resetting command is obtained by encrypting the first characteristic code with adoption of a first key, and returned by the server after receiving the first characteristic code; and
decrypting the password resetting command by adopting a second key, and resetting the password of the network monitoring device by utilizing the reset password, wherein the first key and the second key are a pair of keys in an asymmetric encryption algorithm;
wherein the password resetting command together with the reset password are transmitted from the client to the network monitoring device; and
wherein the client is remote from the network monitoring device.

7. The network monitoring device as claimed in claim 6, wherein the processor, when executing the program, is configured to perform the further steps of:
before sending the first characteristic code to the server, setting a valid period of the first characteristic code; and
after receiving the password resetting command from the server and the reset password from the client, judging whether the password resetting command is received within the valid period,
wherein when a judging result is that the password resetting command is received within the valid period, the password resetting command is decrypted by adopting the second key, and the password of the network monitoring device is reset by utilizing the reset password.

8. The network monitoring device as claimed in claim 6, wherein the processor, when executing the program, is configured to perform the further steps of:
after receiving the password resetting command from the server and the reset password from the client, judging whether the reset password is valid,
when a judging result is that the reset password is valid, resetting the password of the network monitoring device by utilizing the reset password, and generating a first reset result, or when the judging result is that the reset password is invalid, generating a second reset result different from the first reset result.

9. The network monitoring device as claimed in claim 6, wherein the processor, when executing the program, is configured to perform the further steps of:
after receiving the password resetting command from the server and the reset password from the client, judging whether the reset password is valid,
when a judging result is that the reset password is valid, resetting the password of the network monitoring device by utilizing the reset password, and generating a first reset result, or when the judging result is that the reset password is invalid, generating a second reset result different from the first reset result.

10. A system for resetting a password of a network monitoring device;
the network monitoring device;
a client configured to send a reset password to the network monitoring device:
a server comprising: a receiver, configured to receive a first characteristic code from the network monitoring device, wherein the network monitoring device generates the first characteristic code according to encrypted content;
an encrypter, configured to encrypt the first characteristic code by utilizing a first key to obtain a password resetting command; and
a sender, configured to send the password resetting command to the network monitoring device, wherein when receiving a reset password from a client and the password resetting command, the network monitoring device decrypts the password resetting command by adopting the second key, and resets a password of the network monitoring device by utilizing the reset password, wherein the first key and the second key are a pair of keys in an asymmetric encryption algorithm;
wherein the password resetting command together with the reset password are transmitted from the client to the network monitoring device; and
wherein the client is remote from the network monitoring device.

* * * * *

UNITED STATES PATENT AND TRADEMARK OFFICE
CERTIFICATE OF CORRECTION

PATENT NO. : 10,831,879 B2  
APPLICATION NO. : 15/576667  
DATED : November 10, 2020  
INVENTOR(S) : Lujie Si Page 1 of 1

It is certified that error appears in the above-identified patent and that said Letters Patent is hereby corrected as shown below:

In the Claims

In Column 17, Claim 5, Line 23, please insert --transmitted-- between "are" and "from".

In Column 17, Claim 6, Line 28, please remove "reselling" and replace with --resetting--.

In Column 17, Claim 6, Line 33, please remove ";" and replace with --:--.

In Column 18, Claim 10, Line 34, please insert --comprising-- after "device".

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*